United States Patent
Zhou et al.

(10) Patent No.: US 10,291,857 B2
(45) Date of Patent: *May 14, 2019

(54) IMAGE CAPTURE CONTROL METHODS AND APPARATUS

(71) Applicant: BEIJING ZHIGU RUI TUO TECH CO., LTD., Beijing (CN)

(72) Inventors: Liang Zhou, Beijing (CN); Lin Du, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 7 days.

This patent is subject to a terminal disclaimer.

(21) Appl. No.: 15/517,688

(22) PCT Filed: Oct. 10, 2015

(86) PCT No.: PCT/CN2015/091605
§ 371 (c)(1),
(2) Date: Apr. 7, 2017

(87) PCT Pub. No.: WO2016/058496
PCT Pub. Date: Apr. 21, 2016

(65) Prior Publication Data
US 2017/0310865 A1    Oct. 26, 2017

(30) Foreign Application Priority Data

Oct. 15, 2014 (CN) .......................... 2014 1 0545530

(51) Int. Cl.
*H04N 5/232* (2006.01)
*H04N 5/235* (2006.01)

(52) U.S. Cl.
CPC .......... *H04N 5/235* (2013.01); *H04N 5/2327* (2013.01)

(58) Field of Classification Search
CPC .......................... H04N 5/235; H04N 5/2327
See application file for complete search history.

(56) References Cited

U.S. PATENT DOCUMENTS

| 7,602,418 B2 | 10/2009 | Border et al. |
| 8,558,913 B2 | 10/2013 | Pillman et al. |

(Continued)

FOREIGN PATENT DOCUMENTS

| CN | 102754426 A | 10/2012 |
| CN | 103380616 A | 10/2013 |

(Continued)

OTHER PUBLICATIONS

International Search Report and Written Opinion for Application No. PCT/CN2015/091605, dated Jan. 14, 2016, 7 pages.

*Primary Examiner* — Nhan T Tran
(74) *Attorney, Agent, or Firm* — Sheppard Mullin Richter & Hampton LLP

(57) ABSTRACT

Embodiments of the present application disclose various image capture control methods and apparatus. One of the image capture control methods comprises: acquiring motion information of an object; determining, according to the motion information, a relative displacement of an image that corresponds to the object on an image sensor within a first exposure duration; determining an imaging region that corresponds to the relative displacement in the image sensor; adjusting an image capture control parameter of the imaging region, to shorten the first exposure duration of the imaging region; and performing, by using the image sensor after being adjusted, an image capture on the object. In the embodiments of the present application, the degree of image blur for the imaging region due to motion of the object is reduced as far as possible, without affecting the quality of an image captured by another region of the image sensor, (Continued)

thereby improving overall quality of an image captured by the image sensor.

32 Claims, 7 Drawing Sheets

(56) References Cited

U.S. PATENT DOCUMENTS

| | | | |
|---|---|---|---|
| 10,038,853 B2 * | 7/2018 | Zhou | H04N 5/2327 |
| 2004/0239771 A1 | 12/2004 | Habe | |
| 2006/0182430 A1 * | 8/2006 | Stavely | G03B 7/003 |
| | | | 396/52 |
| 2009/0021621 A1 | 1/2009 | Hashimoto et al. | |
| 2009/0208062 A1 * | 8/2009 | Sorek | H04N 5/232 |
| | | | 382/107 |
| 2010/0231738 A1 * | 9/2010 | Border | H04N 5/232 |
| | | | 348/222.1 |
| 2013/0329128 A1 | 12/2013 | Kaizu et al. | |

FOREIGN PATENT DOCUMENTS

| | | |
|---|---|---|
| CN | 103581563 A | 2/2014 |
| CN | 104363381 A | 2/2015 |

\* cited by examiner

IMAGE CAPTURE CONTROL METHODS AND APPARATUS

CROSS-REFERENCE TO RELATED APPLICATIONS

This application is a National Phase Application of International Application No. PCT/CN2015/091605, filed on Oct. 10, 2015, which claims the benefit of priority to Chinese Patent Application No. 201410545530.4, filed on Oct. 15, 2014, and entitled "Image Capture Control Methods and Apparatus", each of which is incorporated by reference herein in its entirety.

TECHNICAL FIELD

The present application relates to the field of image processing technologies, and in particular, to various image capture control methods and apparatus.

BACKGROUND

New image capture technologies and devices are continuously being developed in response to people's increasing demands. In some situations, a fast moving object may not be captured clearly and shows as a blur image, causing an inferior image quality.

SUMMARY

The following briefly describes the present application, so as to provide a basic understanding of some aspects of the present application. It should be understood that, the brief description is not an exhaustive brief description of the present application. The description is neither intended to determine key or important parts of the present application, nor intended to limit the scope of the present application. An objective thereof is merely to give some concepts in a simplified manner as a preface for more detailed description hereinafter.

The present application provides various image capture control methods and apparatus.

In one aspect, an embodiment of the present application provides an image capture control method, comprising:

acquiring motion information of an object to be shot;

determining, according to the motion information, a relative displacement of an image that corresponds to the object to be shot on an image sensor within a first exposure duration;

determining an imaging region that corresponds to the relative displacement in the image sensor;

adjusting an image capture control parameter of the imaging region, to shorten the first exposure duration of the imaging region; and performing, by using the image sensor after being adjusted, an image capture on the object to be shot.

In another aspect, an embodiment of the present application further provides an image capture control apparatus, comprising:

a motion information acquiring module, configured to acquire motion information of an object to be shot;

a relative displacement determining module, configured to determine, according to the motion information, a relative displacement of an image that corresponds to the object to be shot on an image sensor within a first exposure duration;

an imaging region determining module, configured to determine an imaging region that corresponds to the relative displacement in the image sensor;

an image capture control parameter adjustment module, configured to adjust an image capture control parameter of the imaging region so as to shorten the first exposure duration of the imaging region; and an image capture module, configured to perform, by using the image sensor after being adjusted, an image capture on the object to be shot.

According to the technical solutions provided by embodiments of the present application, an imaging region of an image sensor that is possibly involved in motion of an object to be shot is determined, and an image capture control parameter of the imaging region is adjusted. Image capture control parameters of the image sensor after being adjusted exhibit differentiated distribution. The image capture control parameter of the imaging region is different from an image capture control parameter of another region, which is manifested as that an exposure duration of the imaging region is shorter than that of the another region of the image sensor during the process of image capture by the image sensor after being adjusted. In this way, for the imaging region of the image sensor that is possibly involved in motion of the object to be shot, exposure may be completed at a high speed so as to reduce the degree of image blur for the imaging region due to motion of the object to be shot as far as possible, without affecting the quality of an image captured by another region of the image sensor, thereby improving overall quality of an image captured by the image sensor.

The following describes in detail alternative embodiments of the present application with reference to accompanying drawings, to make these and other advantages of the present application more obvious.

BRIEF DESCRIPTION OF THE DRAWINGS

The present application may be understood better with reference to the following description in combination with accompanying drawings, wherein a same or similar accompanying drawing mark is used in all the accompanying drawings to represent a same or similar component. The accompanying drawings together with the following detailed description are comprised in the specification and constitute a part of the specification, and are used to further illustrate alternative embodiments of the present application and explain the principle and advantages of the present application. In the accompanying drawings.

A person skilled in the art should understand that, elements in the accompanying drawings are merely shown for simplicity and clarity, and are not necessarily drawn to scale. For example, in the accompanying drawings, the size of an element may be enlarged relative to another element, so as to facilitate enhancing an understanding of the embodiments of the present application.

DETAILED DESCRIPTION

The following will describe in details illustrative embodiments of the present application with reference to accompanying drawings. For the purpose of clear and brief description, the specification does not describe all features of practical implementation manners. However, it should be understood that, many decisions specific to the implementation manners must be made during development of any one of the practical embodiments, so as to achieve a specific objective of a developer, for example, conformance to restrictive conditions related with a system and service, wherein the restrictive conditions may vary with different implementation manners. In addition, it should also be understood that, although development work may be very complex and time-consuming, for a person skilled in the art that benefits from the content of the present disclosure, the development work is only a routine task.

Another point that should be noted here is, to avoid the present application from being not clearly understood due to unnecessary details, the accompanying drawings and specification merely describe apparatus structures and/or processing steps closely related to the solutions of the present application, but omit the representation and description of parts and processing that have little relation with the present application, and have been known by a person of ordinary skill in the art.

The following further describes in detail specific implementation manners of the present application with reference to the accompanying drawings (a same label represents a same element in several accompanying drawings) and embodiments. The following embodiments are used to describe the present application, but are not intended to limit the scope of the present application.

A person skilled in the art may understand that, terms such as "first" and "second" in the present application are merely used to distinguish different steps, devices or modules, which neither represent any specific technical meaning, nor represent a necessary logic sequence among them.

Figure 1A:
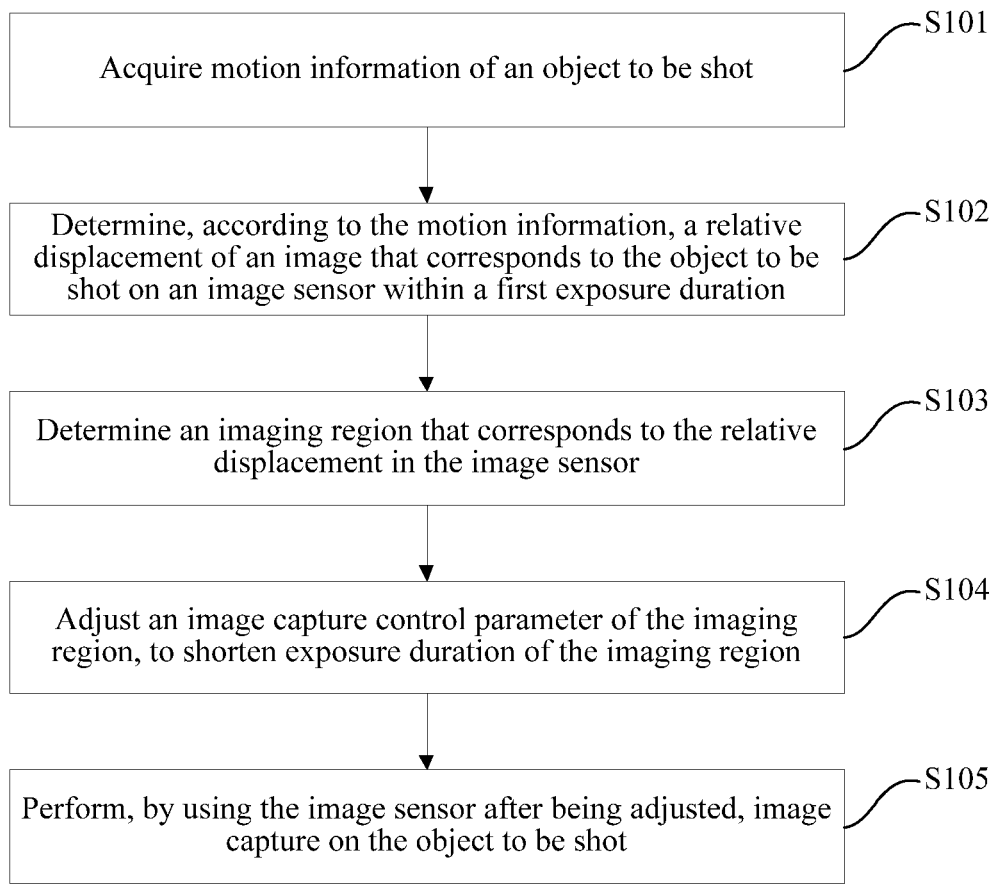
FIG. 1a is a flowchart of an image capture control method according to an embodiment of the present application.

FIG. 1a is a flowchart of an image capture control method according to an embodiment of the present application. The image capture control method provided by this embodiment of the present application may be executed by an image capture control apparatus, wherein the image capture control apparatus can perform control over capture of a static or dynamic image by using the image capture control method during an application procedure, including but not limited to: photo taking, camera shooting, photographing, and video monitoring. There is no limit to the manners in which the image capture control apparatus is embodied. For example, the image capture control apparatus may be an independent component, the component cooperating with an image capture device comprising an image sensor in communications; or the image capture control apparatus may be integrated as a functional module into an image capture device comprising an image sensor, which is not limited in this embodiment of the present application.

Specifically, as shown in FIG. 1a, an image capture control method provided by this embodiment of the present application comprises:

S101: Acquire motion information of an object to be shot.

Motion information of the object to be shot may comprise but is not limited to information such as a motion speed and motion distance of the object to be shot. The object to be shot may be an independent object, or a part of an object, such as a hand part of a human body.

S102: Determine, according to the motion information, a relative displacement of an image that corresponds to the object to be shot on an image sensor within a first exposure duration.

In a scenario of image capture by using an image capture apparatus, a certain zooming scale may generally exist between the size of an object to be shot and that of an image captured by an image sensor for the object to be shot. The zooming scale is related to factors such as an object distance of the object to be shot, and a focal length of a lens of the image capture apparatus. When the object to be shot moves a distance within a certain time length (such as a first exposure duration), a relative displacement of an image that corresponds to the object to be shot on an image sensor may be calculated according to the zooming scale from the motion distance of the object to be shot in a scene to be shot.

The first exposure duration is an exposure duration that has been determined when an image capture apparatus performs image capture, for example, a default exposure duration for a current scene to be shot. The meaning of the first exposure duration may vary slightly with different types of image sensors or different exposure modes of image capture of an image sensor. For example, for an image sensor that supports progressive scanning and capture, such as a rolling shutter image sensor, the first exposure duration may be a default exposure duration for each row of pixels of the image sensor; for another example, for an image sensor that supports single pixel point exposure adjustment, the first exposure duration may be a default exposure duration of a single pixel point of the image sensor; and the like.

S103: Determine an imaging region that corresponds to the relative displacement in the image sensor.

An imaging region that corresponds to the relative displacement may be various pixel points that correspond to the object to be shot and a relative displacement thereof in the image sensor, which is accurate as determined in this manner; or may be a pixel row of various pixel points that correspond to the object to be shot and a relative displacement thereof in the image sensor, which is a rough imaging region as determined in this manner.

S104: Adjust an image capture control parameter of the imaging region, to shorten exposure duration of the imaging region.

Adjustment on an image capture control parameter of a partial region for the image sensor, means performing adjustment on an image capture control parameter of the imaging region but not performing adjustment on that of another region of the image sensor (retaining a default image capture control parameter previously determined for the another region), to cause an exposure duration of the imaging region in the image sensor to be shorter and an exposure duration of the another region in the image sensor to be longer.

S105: Perform, by using the image sensor after being adjusted, image capture on the object to be shot.

According to the image capture control method provided by this embodiment of the present application, an imaging region of an image sensor that is possibly involved in motion of an object to be shot is determined, and an image capture control parameter of the imaging region is adjusted. Image capture control parameters of the image sensor after being adjusted exhibit differentiated distribution. The image capture control parameter of the imaging region is different from an image capture control parameter of another region, which is manifested as that an exposure duration of the imaging region is shorter than that of another region of the image sensor during the process of image capture by the image sensor after being adjusted. In this way, for the imaging region of an image sensor that is possibly involved in motion of the object to be shot, exposure may be completed at a high speed so as to reduce the degree of image blur for the imaging region due to motion of the object to be shot as far as possible, without affecting the quality of an image captured by another region of the image sensor, thereby improving overall quality of an image captured by the image sensor.

In the technical solution provided by this embodiment of the present application, the manner of acquiring motion information of the object to be shot is very flexible, which is not limited in this embodiment of the present application.

In an alternative implementation manner, an image capture control apparatus may receive motion information of the object to be shot. That is, the image capture control apparatus acquires motion information of the object to be shot from the outside. For example, if the object to be shot is a human body, a wearable device such as a smart band and smart glasses on the human body acquires motion information of the human body by using a motion sensor and sends the motion information to the image capture control apparatus; or the image capture control apparatus may receive through a communications network motion information of the object to be shot from the outside, such as an image capture device that is not integrated with the image capture control apparatus, another component of an image capture device, or a cloud. In this solution, image capture control may be implemented by fully utilizing interaction of intelligent devices or in a manner such as sharing of motion information of an object to be shot, so as to improve flexibility of motion information acquiring.

In another alternative implementation manner, an image capture control apparatus may acquire motion information of the object to be shot in a manner of pre-analysis before image capture. For example, the image capture control apparatus may analyze a preview image of the object to be shot, and acquire motion information of the object to be shot according to an analysis result. The preview image may be a series of images during view finding before an image capture device is formally triggered to perform image capture control. By means of analyzing these images, a rough motion trend of the object to be shot may be acquired according to an analysis result, that is, motion information of the object to be shot may be acquired. In this solution, motion information of an object to be shot is acquired by means of analyzing a preview image of the object to be shot before formal shooting and estimating a rough motion trend of the object to be shot, which is simple and easily implemented.

After motion information of the object to be shot is acquired, whether it needs to trigger adjustment on an image capture control parameter of the imaging region may be determined according to actual situation. For example, the relative displacement may be compared with an allowable displacement. Accordingly, under this circumstance, the adjusting an image capture control parameter of the imaging region comprises: adjusting, in response to a case in which a comparison result shows that the relative displacement exceeds the allowable displacement, an image capture control parameter of the imaging region. Generally, during the process of image capture by an image capture device, if motion of an object to be shot is within a very small range (such as a slight shaking), limitation of factors such as photosensitivity of pixels of the image capture device may not cause a very great impact on clearness of an captured image. Therefore, an allowable displacement may be determined according to actual requirements for imaging quality such as imaging clearness of an object to be shot. If a motion distance of an object to be shot is less than the allowable displacement during the process of image capture, an image capture control parameter of the imaging region is not adjusted. Under this circumstance, image capture may be performed according to a default value or a preset value of an image capture control parameter of the image sensor. If a motion distance of an object to be shot is more than or equal to the allowable displacement during the process of image capture, adjustment on an image capture control parameter of the imaging region is triggered to shorten exposure duration of the imaging region, so as to reduce the degree of image blur for the imaging region due to motion of the object to be shot as far as possible, without affecting imaging quality of another region of the image sensor. In this solution, partial adjustment on an image capture control parameter of the image sensor may also be triggered and controlled, thereby improving universality of this embodiment of the present application, and satisfying a user's diversified actual application demands. Further, the image capture control method may further comprise: acquiring the allowable displacement. The manner of acquiring the allowable displacement is very flexible, for example, the allowable displacement may be determined according to software and hardware performances such as an optical performance of an image capture device; for another example, the allowable displacement may be set according to a user's requirements for the quality such as imaging clearness of an object to be shot; and the like, which is not limited in this embodiment of the present application.

Under a circumstance that an image capture control parameter of the imaging region needs to be adjusted, the adjustment manner in the image capture control method is very flexible. For example, the adjusting an image capture control parameter of the imaging region comprises: determining a second exposure duration, the second exposure duration being less than the first exposure duration; and adjusting, according to the second exposure duration, an image capture control parameter of the imaging region. In practical application, a short expected exposure duration, namely, a second exposure duration, may be determined according to an expectation for clearness of an image captured by the imaging region. An image capture control parameter of the imaging region is adjusted according to the determined second exposure duration, to cause actual exposure duration of the imaging region during image capture after adjustment on the image capture control parameter to be equal to or close to the second exposure duration as far as possible. In this solution, a short expected exposure duration may be flexibly determined according to actual demands, based on which an image capture control parameter of the imaging region is adjusted so as to improve a matching degree between an adjustment result and actual demands.

The manner of determining the second exposure duration is very flexible, which is not limited in this embodiment of the present application. In an alternative implementation manner, the determining a second exposure duration comprises: acquiring an object distance of an object to be shot; determining, according to the allowable displacement, the object distance and the motion information, exposure duration limit information; and determining, according to the exposure duration limit information, the second exposure duration.

For example, supposing an object to be shot moves at an average speed v in a scene to be shot, and a default first exposure duration of an image capture device is $$\frac{1}{N}$$

unit time, then a relative displacement of an image of the object to be shot on an image sensor within $$\frac{1}{N}$$

unit time is $$R\frac{v}{N},$$

wherein, $$R = \frac{F}{D}$$

represents a zooming factor, F represents a focal length of a lens of an image sensor, and D represents an object distance of an object to be shot. In order to reduce the degree of partial blur of an image captured by the image sensor due to motion of the object to be shot as far as possible, the following formula should be met:

$$R\frac{v}{N} = \frac{Fv}{DN} \le C \quad (1)$$

wherein, C represents an allowable displacement. The following can be obtained according to formula (1):

$$N \ge \frac{Fv}{DC} \quad (2)$$

Formula (2) indicates the exposure duration limit information. The second exposure duration may be determined according to the exposure duration limit information.

It should be noted that, the meanings of the first exposure duration and the second exposure duration may vary slightly with different types of image sensors or different exposure modes of image capture of an image sensor, which may be determined according to actual situation. For example, for an image sensor that supports progressive scanning and capture, such as a rolling shutter image sensor, the first exposure duration may be a default exposure duration for each row of pixels of the image sensor, and the second exposure duration is an expected exposure duration of a row where pixel points of the imaging region are located; for another example, for an image sensor that supports single pixel point exposure adjustment, the first exposure duration may be a default exposure duration of a single pixel point of the image sensor, and the second exposure duration is an expected exposure duration of a single pixel point of the imaging region; and the like.

In practical application, a great many of image capture control parameters affect exposure duration. One or more image capture control parameters may be selected for adjustment according to actual demands, so as to achieve a purpose of shortening actual exposure duration of the imaging region by means of adjustment on one or more image capture control parameters.

(I) In an alternative implementation manner, the image capture control parameter comprises photosensitivity. Under this circumstance, the adjusting an image capture control parameter of the imaging region, to shorten exposure duration of the imaging region comprises: adjusting photosensitivity of the imaging region to shorten exposure duration of the imaging region.

In this solution, an exposure duration of a partial region (namely, the imaging region) of the image sensor is shortened by means of adjusting photosensitivity of the imaging region, to cause spatial resolution of an entire image captured by the image sensor not to change as far as possible, and reduce the degree of partial image blur caused by motion of an object to be shot during the process of image capture as far as possible, thereby improving imaging quality of the entire image.

The manner of adjusting photosensitivity of the imaging region is very flexible, which is not limited in this embodiment of the present application.

(1) The manner of adjusting photosensitivity of the imaging region may be, for example, determining, according to the second exposure duration, a photosensitivity adjustment parameter; and adjusting, according to the determined photosensitivity adjustment parameter, photosensitivity of the imaging region. The photosensitivity adjustment parameter may comprise but is not limited to ISO (International Standards Organization) sensitivity. The ISO sensitivity indicates sensitivity of an optical component comprising pixel points to light in a numerical form. If the ISO sensitivity is higher, it indicates that the optical component comprising pixel points is more sensitive to light, an exposure quantity needed is greater, and an exposure duration needed is longer; otherwise, if the ISO sensitivity is lower, it indicates that an optical component comprising pixel points is less sensitive to light, an exposure quantity needed is smaller, and an exposure duration needed is shorter. The ISO sensitivity is commonly expressed by using ISO100, ISO400, ISO1000, and the like. If photosensitivity of the imaging region is adjusted by using this solution, a matching degree between an adjustment result and actual demands may be improved.

Further, the implementation manner of determining a photosensitivity adjustment parameter according to the second exposure duration is also very flexible, which is not limited in this embodiment of the present application. Optionally, a photosensitivity adjustment parameter corresponding to the second exposure duration may be determined according to a first mapping relationship between an exposure duration and a photosensitivity adjustment parameter. The first mapping relationship may be established in advance, and stored in a manner of (but not limited to) form, as shown in Table 1:

TABLE 1

Example of First Mapping Relationship between
Exposure Duration and ISO Sensitivity

| ISO Sensitivity | Exposure Duration |
| --- | --- |
| 100 | 15 unit time |
| 200 | 8 unit time |
| 400 | 4 unit time |
| 800 | 2 unit time |
| 1600 | 1 unit time |

An ISO sensitivity corresponding to a second exposure duration may be determined from Table 1, and photosensitivity of the imaging region is adjusted according to the determined ISO sensitivity. This solution is simple and easily implemented with a high efficiency.

(2) The manner of adjusting photosensitivity of the imaging region may be, for another example, comprehensively determining the photosensitivity adjustment parameter by combining factors such as lighting information of an object to be shot and a second exposure duration. Specifically, the image capture control method may further comprise acquiring lighting information of the object to be shot; and the adjusting photosensitivity of the imaging region may comprise: determining, according to lighting information of the object to be shot and the second exposure duration, a photosensitivity adjustment parameter; and adjusting, according to the determined photosensitivity adjustment parameter, photosensitivity of the imaging region. As lighting information is a factor affecting the quality of an image captured by an image sensor, the photosensitivity adjustment parameter is comprehensively determined by combining factors such as lighting information of an object to be shot and a second exposure duration, thereby improving accuracy of the photosensitivity adjustment.

Further, the implementation manner of determining a photosensitivity adjustment parameter according to lighting information of the object to be shot and the second exposure duration is also very flexible, which is not limited in this embodiment of the present application. Optionally, a photosensitivity adjustment parameter that corresponds to the lighting information of the object to be shot and the second exposure duration may be determined according to a second mapping relationship between lighting information, an exposure duration and a photosensitivity adjustment parameter. The lighting information may comprise but is not limited to a light level of an object to be shot, an aperture, and the like. The second mapping relationship may be established in advance, and stored for different lighting information in a manner of form as shown in Table 2. In this way, there may be multiple forms similar to Table 2 for different lighting information, so as to improve universality of this solution.

TABLE 2

Example of Second Mapping Relationship between Lighting
Information, Exposure Duration and ISO Sensitivity
Lighting Information: light level 1.25 lux, and aperture F/2.5

| ISO Sensitivity | Exposure Duration |
| --- | --- |
| 100 | 15 unit time |
| 200 | 8 unit time |
| 400 | 4 unit time |
| 800 | 2 unit time |
| 1600 | 1 unit time |

It may be understood that, the above Table 1 and Table 2 are only used for illustration, and shall not be considered as a limit to the essence of the technical solution in this embodiment of the present application.

(II) In another alternative implementation manner, the image capture control parameter comprises a pixel binning capture parameter. Under this circumstance, the adjusting an image capture control parameter of the imaging region, to shorten exposure duration of the imaging region comprises: adjusting a pixel binning capture parameter of the imaging region to shorten exposure duration of the imaging region.

With a pixel binning capture function, several adjacent pixels in an image sensor such as a charge-coupled device (CCD) may be combined as one pixel to perform image capture, thereby improving the capability of the image sensor in respect of pixel response and photon flux per unit time, which is equivalent to increasing the amount of optical information captured within a same exposure duration. That is, when a same amount of optical information needs to be captured, an exposure duration needed may be shortened by using the pixel binning capture function.

In this solution, an exposure duration of a partial region (namely, the imaging region) of the image sensor is shortened by means of adjusting a pixel binning capture parameter of the imaging region, to cause a signal-to-noise ratio (Signal to Noise Ratio, SNR for short) of an entire image captured by the image sensor not to change as far as possible, and reduce the degree of partial image blur caused by motion of an object to be shot during the process of image capture as far as possible, thereby improving imaging quality of the entire image.

The manner of adjusting a pixel binning capture parameter of the imaging region is very flexible, which is not limited in this embodiment of the present application. For example, a pixel binning manner that corresponds to the second exposure duration may be determined according to a second mapping relationship between an exposure duration and a pixel binning (Pixel Binning Combination) manner; and a pixel binning capture parameter of the imaging region is adjusted according to the pixel binning manner.

The pixel binning manner may also be referred to as a pixel binning factor, which is used for representing the manner of combining adjacent pixels of an image sensor in a two-dimensional manner. For example, a pixel binning manner 1×2 represents combining every two adjacent pixels in a same row as a new pixel; a pixel binning manner 2×2 represents combining every two adjacent pixels in each row of every two adjacent rows (namely, 4 pixels) as a new pixel; and the like.

The pixel binning capture parameter comprises one or more control parameters during image capture based on a pixel binning function, which may comprise, for example but not limited to, pixel row readout drive information, pixel point readout control information and the like. When image capture is performed by using an image sensor on the object to be shot, a shutter of an image capture device such as a camera is in an open state. The shutter remains in the open state until image capture is completed and then closed. A duration for a shutter to switch from a open state to a closed state is generally a duration needed during an image capture process. Each image capture process comprises one or more image capture sub-processes. Multiple image capture sub-processes may be performed in a time division manner, or partially performed at the same time, or the like. Each image capture sub-process may correspond to image capture of a single pixel point, image capture of multiple pixel points, capture of a single row of pixel points, image capture of multiple rows of pixel points, or the like, which is specifically determined according to actual situation. An optional manner of image capture on a point-by-point basis may be used as an example for description. A duration needed during an image capture process is generally a duration for a shutter of an image capture device to switch from an open state to a closed state, that is, a duration of a shutter continuously remaining in an open state. Within the duration of a shutter continuously remaining in an open state, image capture sub-processes of multiple pixel points are included. For the image capture sub-process of each pixel point, refer to FIG. 2, which may be divided into a reset phase, an exposure phase, and a pixel readout phase. A duration needed for the exposure phase is the exposure duration described in this embodiment of the present application. A total duration needed for the three phases including the reset phase, the exposure phase and the pixel readout phase is a frame time needed for the image capture sub-process. A total duration needed for capture of all pixel points is a duration for a shutter to switch from an open state to a closed state during the image capture process. That is, when a driving voltage is applied on a pixel, the pixel is first reset (during a reset phase), and then exposed for capture (during an exposure phase); and after exposure, readout of optical information captured by the pixel is performed (during a pixel readout phase). Supposing a pixel binning manner that corresponds to the second exposure duration is 1×2, then according to the pixel binning manner, pixel readout drive information in a pixel binning capture parameter of a partial region (namely, the imaging region) of an image sensor is adjusted to simultaneously driving two adjacent pixels, and the pixel point readout control information is set to dot interlaced readout. During readout, information separately captured by two pixel points in a same pixel combination is processed by means of integration or accumulation, or the like. After a pixel binning capture parameter is adjusted according to the pixel binning manner, image capture control is actually performed by using 2 adjacent pixel points as a new pixel point in the imaging region during the image capture process. That is, exposure of 2 pixel points is completed during an exposure phase of an image capture sub-process to shorten exposure duration, so as to cause a signal-to-noise ratio of an entire image captured by an image sensor not to change as far as possible, and reduce the degree of partial image blur caused by motion of an object to be shot during the process of image capture, thereby improving imaging quality of the entire image.

Figure 2:
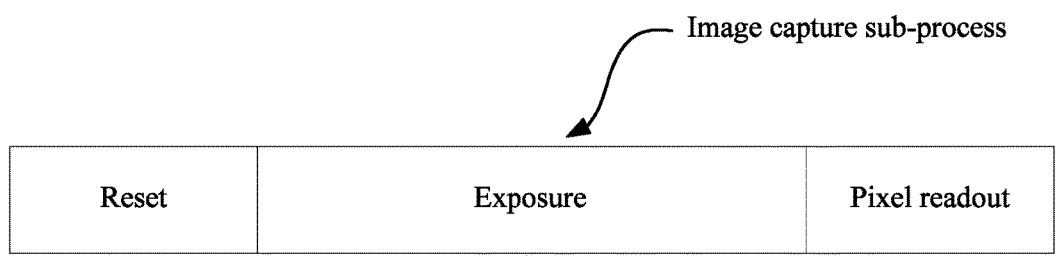
FIG. 2 is an alternative example of an image capture sub-process, according to an embodiment of the present application.

It may be understood that, the foregoing description is merely for illustration by using an image capture control method of an image sensor that supports image capture on a point-by-point basis. For an image capture control method of an image sensor that supports image capture on a line-by-line basis, the imaging region is a pixel row comprising various pixel points that correspond to the object to be shot and a relative displacement thereof in the image sensor. This circumstance is similar to the image capture control method of an image sensor that supports image capture on a point-by-point basis, and the details are not described herein again. In addition, an image capture sub-process as shown in FIG. 2 is merely an optional process for capture of a pixel point or a row of pixel points in this embodiment of the present application, and shall not be understood as a limitation to this embodiment of the present application. Further, under a circumstance that synchronous readout of multiple pixel points or multiple rows of pixels is supported by multiple readout circuits, different pixel points or different rows of pixels may be distinguished for readout by using a single readout circuit in a manner of allocating different reset times for different pixel points or different rows of pixels, so as to achieve readout of a single pixel point or a single row of pixels by the readout circuit at the same time.

Optionally, the implementation manner of adjusting a pixel binning capture parameter of the imaging region is also very flexible, which is not limited in this embodiment of the present application. Optionally, a pixel binning manner corresponding to the second exposure duration may be determined according to a third mapping relationship between an exposure duration and a pixel binning manner; and a pixel binning capture parameter of the imaging region is adjusted according to the pixel binning manner. The third mapping relationship may be established in advance, and stored in a manner of (but not limited to) form, as shown in Table 3:

TABLE 3

Example of Third Mapping Relationship between Exposure Duration and Pixel Binning Manner

| Pixel Binning | Exposure Duration |
| --- | --- |
| 1 × 1 | 1 unit time |
| 1 × 2 | 0.5 unit time |
| 2 × 2 | 0.25 unit time |

It may be understood that, the above Table 3 is only used for illustration, and shall not be considered as a limit to the essence of the technical solution in this embodiment of the present application.

Further, the inventor of the present application found during implementation of the embodiments of the present application that, when image capture control is performed in a pixel binning manner, spatial resolution of a sub-image that corresponds to the imaging region in an image captured by an image sensor may be reduced. If the spatial resolution of the sub-image that corresponds to the imaging region is to be improved, the number of pixel points in the imaging region may be increased. Specifically, before the adjusting a pixel binning capture parameter of the imaging region, the method may further comprise: adjusting pixel distribution of the image sensor to increase the number of pixel points within the imaging region. In this solution, the number of pixel points within the imaging region is increased so as to improve spatial resolution of a sub-image that corresponds to the imaging region in an image captured by an image sensor.

In practical application, the manner of adjusting pixel distribution of the image sensor may be selected according to actual demands, which is not limited in this embodiment of the present application.

For example, the image sensor may comprise but is not limited to a flexible image sensor. The flexible image sensor comprises a flexible lining, and a plurality of image sensor pixels formed on the flexible lining, wherein the flexible lining may change such as expand, shrink, or bend when a certain condition is met, so as to adjust pixel density distribution thereof. In this embodiment of the present application, in combination with the feature of the image sensor in respect of adjustable pixel density distribution, pixel density distribution of the image sensor is adjusted to increase the number of pixel points within the imaging region.

For another example, the image sensor may comprise a controllably-deformable material part, wherein the controllably-deformable material part may be controlled to deform, so as to accordingly adjust pixel distribution of the imaging region of the image sensor. In this solution, pixel distribution of the image sensor is adjusted by controlling deformation of a controllably-deformable material part, which is simple and easily implemented.

For the controllably-deformable material part, when an external influencing factor (such as an external field) acting thereon is changed, the controllably-deformable material part can be caused to deform; and when the external field acting thereon is removed or changed, the deformation of the controllably-deformable material part can be recovered.

Figure 1B:
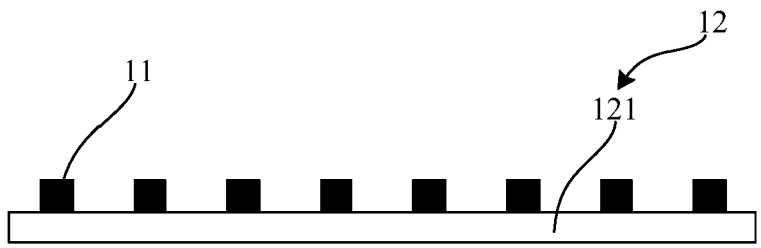
FIG. 1b is a schematic structural diagram of a first image sensor with an adjustable pixel density, according to an embodiment of the present application.

FIG. 1b is a schematic structural diagram of a first image sensor with an adjustable pixel density according to an embodiment of the present application. As shown in FIG. 1b, the image sensor with an adjustable pixel density provided by this embodiment of the present application comprises: a plurality of image sensor pixels 11 and a controllably-deformable material part 12, wherein the image sensor performs image capture by using the image sensor pixels 11; the plurality of image sensor pixels 11 are distributed in an array form; the controllably-deformable material part 12 is connected to the plurality of image sensor pixels 11 separately; and the controllably-deformable material part 12 may deform under the effect of an external field, so as to accordingly adjust distribution of the plurality of image sensor pixels 11.

In the technical solution provided by this embodiment of the present application, for the controllably-deformable material part, when an external field influencing factor acting thereon is changed, the controllably-deformable material part can be caused to deform; and when the external field influencing factor is removed or changed, the deformation of the controllably-deformable material part can be recovered. The external field may be selected from a corresponding external control filed acting thereon according to deformation characteristics of the controllably-deformable material part. For example, the external field comprises but is not limited to an external electric field, a magnetic field, a light field, and the like. The image sensor pixel may comprise but is not limited to at least one photoelectric conversion unit. Each image sensor pixel and a controllably-deformable material part may be closely connected by using (but not limited to) an adhesion manner, so that when the controllably-deformable material part deforms, an interval between the image sensor pixels is accordingly adjusted, so as to change pixel distribution of the image sensor, and achieve an effect of differentiated pixel density distribution in different regions of the image sensor according to actual demands.

In practical application, an unevenly distributed external field may be applied on different regions of the controllably-deformable material part, to cause the different regions of the controllably-deformable material part to undergo different degrees of deformation, thereby adjusting integral distribution of image sensor pixels. Optionally, the external field may be applied on a region where the controllably-deformable material part and the plurality of image sensor pixels are not overlapped, to cause an overlap region of the controllably-deformable material part and the plurality of image sensor pixels not to deform. Instead, distribution of image sensor pixels is changed through deformation of another part of the controllably-deformable material part. This solution is favorable to preventing damage to the image sensor pixels caused by deformation of the controllably-deformable material part.

In practical application, the controllably-deformable material part may be made by selecting at least one suitable controllably-deformable material as demanded, to cause the controllably-deformable material part to have a feature of deformability and deformation recoverability. Optionally, the controllably-deformable material part is made from at least one or more of the following controllably-deformable materials: a piezoelectric material, an electroactive polymer, a photo-deformable material, and a magnetostrictive material.

The piezoelectric material may undergo mechanical deformation under an effect of an electric field. A controllably-deformable material part made by using the piezoelectric material is referred to as a piezoelectric material part below. With this physical property of the piezoelectric material, in this embodiment of the present application, electric field control information required for causing the piezoelectric material part to undergo corresponding mechanical deformation is determined according to (but not limited to) a target sub-pixel offset distance, and an electric field acting on the piezoelectric material part is controlled according to the electric field control information, to cause the piezoelectric material part to undergo corresponding mechanical deformation, so as to accordingly adjust pixel distribution of an image sensor, thereby achieving a purpose of adjusting pixel density distribution of the image sensor according to the target sub-pixel offset distance. The piezoelectric material may comprise but is not limited to at least one of the following: a piezoelectric ceramic, and a piezoelectric crystal. This solution can fully utilize a physical property of a piezoelectric material to adjust pixel distribution of an image sensor.

The electroactive polymers (EAP for short) are a type of polymer materials that may be changed in shape or size under an effect of an electric field. A controllably-deformable material part made by using the electroactive polymer is referred to as an electroactive polymer part below. With this physical property of the electroactive polymers, in this embodiment of the present application, electric field control information required for causing the electroactive polymer part to undergo corresponding deformation is determined according to (but not limited to) the target sub-pixel offset distance, and an electric field acting on the electroactive polymer layer is controlled according to the electric field control information, to cause the electroactive polymer layer to undergo corresponding deformation, so as to accordingly adjust pixel distribution of an image sensor, thereby achieving a purpose of adjusting pixel distribution of the image sensor according to the target sub-pixel offset distance. The electroactive polymer may comprise but is not limited to at least one of the following: an electronic electroactive polymer, and an ionic electroactive polymer, wherein the electronic electroactive polymer comprises at least one of the following: a ferroelectric polymer (such as polyvinylidene fluoride), an electrostrictive graft polymer, and a liquid crystalline elastomer; and the ionic electroactive polymer comprises at least one of the following: an electrorheological fluid, and an ionic polymer-metal composite. This solution can fully utilize a physical property of an electroactive polymer to adjust pixel distribution of an image sensor.

The photo-deformable material is a type of macromolecule material that may exhibit a change in shape or size under an effect of a light field. A controllably-deformable material part made by using the photo-deformable material is referred to as a photo-deformable material part below. With this physical property of the photo-deformable material, in this embodiment of the present application, light field control information required for causing a photo-deformable material part to undergo corresponding deformation is determined according to (but not limited to) the target sub-pixel offset distance, and a light field acting on the photo-deformable material part is controlled according to the light field control information, to cause the photo-deformable material part to undergo corresponding deformation. Pixel distribution of an image sensor is accordingly adjusted through deformation of the photo-deformable material part, thereby achieving a purpose of adjusting pixel distribution of the image sensor according to the target sub-pixel offset distance. The photo-deformable material may comprise but is not limited to at least one of the following: a photostrictive ferroelectric ceramic and a photo-deformable polymer, wherein the photostrictive ferroelectric ceramic comprises but is not limited to a lead lanthanum zirconate titanate (PLZT) ceramic, and the photo-deformable polymer comprises but is not limited to a photo-deformable liquid crystalline elastomer. This solution can fully utilize a physical property of a photo-deformable material to adjust pixel distribution of an image sensor.

The magnetostrictive material is a type of magnetic material that may exhibit a change in magnetic state under an effect of a magnetic field, and then exhibit a change in size thereof. A controllably-deformable material part made by using the magnetostrictive material is referred to as a magnetostrictive material part below. With this physical property of the magnetostrictive material, in this embodiment of the present application, magnetic field control information required for causing a magnetostrictive material part to undergo corresponding deformation is determined according to (but not limited to) the target sub-pixel offset distance, and a magnetic field acting on the magnetostrictive material part is controlled according to the magnetic field control information, to cause the magnetostrictive material part to undergo corresponding deformation. Pixel distribution of an image sensor is accordingly adjusted through deformation of the magnetostrictive material part, thereby achieving a purpose of adjusting pixel distribution of the image sensor according to the target sub-pixel offset distance. The magnetostrictive material may comprise but is not limited to a rare-earth iron giant magnetostrictive material, such as an alloy material $Tbo_{0.3}Dy_{0.7}Fe_{1.95}$ with a compound $(Tb, Dy)Fe_2$ as a substrate. This solution can fully utilize a physical property of a magnetostrictive material to adjust pixel distribution of an image sensor.

In the technical solution provided by this embodiment of the present application, specific structures and connection manners of image sensor pixels and the controllably-deformable material part may be determined according to actual demands, and practical manners are very flexible.

In an alternative implementation manner, as shown in FIG. 1b, the controllably-deformable material part 12 comprises a controllably-deformable material layer 121, wherein the plurality of image sensor pixels 11 is distributed in an array form and connected to a surface of the controllably-deformable material layer 121. Optionally, depending on actual technological conditions, the plurality of image sensor pixels are directly formed on the controllably-deformable material layer 12, or the plurality of image sensor pixels and the controllably-deformable material layer 12 are separately made and closely connected by using (but not limited to) an adhesion manner. This solution features a simple structure and is easily implemented.

Figure 1C:
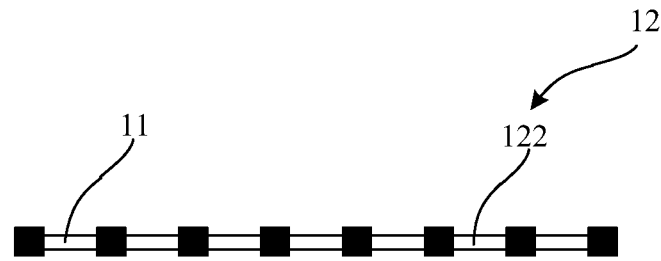
FIG. 1c is a schematic structural diagram of a second image sensor with an adjustable pixel density, according to an embodiment of the present application.

In another alternative implementation manner, as shown in FIG. 1c, the controllably-deformable material part 12 comprises a plurality of controllably-deformable material connection sub-parts 122, wherein the plurality of controllably-deformable material connection sub-parts 122 is distributed in an array form, and correspondingly connected to the plurality of image sensor pixels 11 distributed in an array form, that is, the plurality of image sensor pixels distributed in an array form is connected as a whole through the plurality of controllably-deformable material connection sub-parts that is distributed in an array form. Optionally, the plurality of controllably-deformable material connection sub-parts may be formed in an interval between pixels of an image sensor pixels array according to actual technology, and the plurality of controllably-deformable material connection sub-parts may be connected to corresponding image sensor pixels by using (but not limited to) an abutting or adhesion manner. Distribution of image sensor pixels can be adjusted by controlling deformation of the plurality of controllably-deformable material connection sub-parts, which features a simple structure and is easily implemented.

Figure 1D:
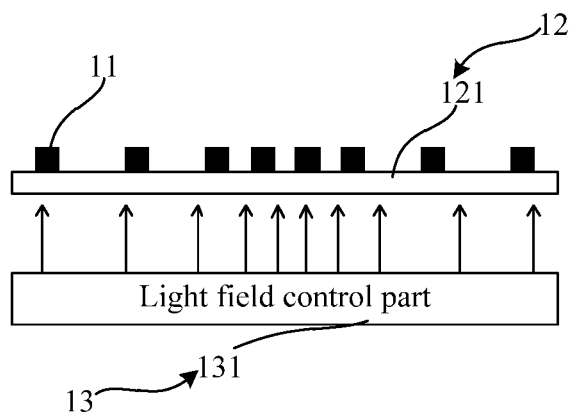
FIG. 1d is a schematic structural diagram of a third image sensor with an adjustable pixel density, according to an embodiment of the present application.
Figure 1E:
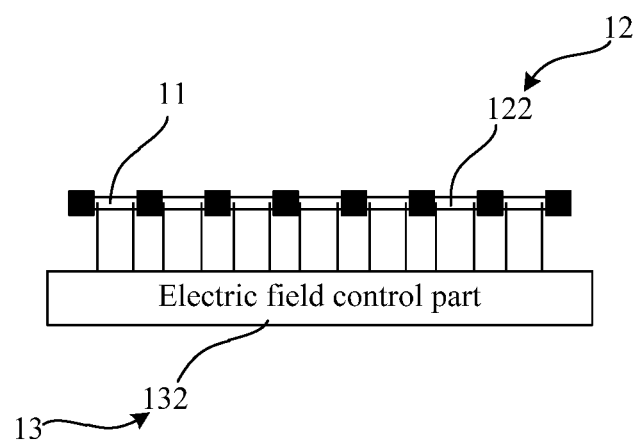
FIG. 1e is a schematic structural diagram of a fourth image sensor with an adjustable pixel density, according to an embodiment of the present application.

Further, as shown in FIG. 1d and FIG. 1e, the image sensor may further comprise a deformation control part 13, wherein the deformation control part 13 is configured to adjust distribution of the external field acting on the controllably-deformable material part 12, so as to control the controllably-deformable material part 12 to undergo corresponding deformation. In this way, when the controllably-deformable material part 12 deforms, an interval between the image sensor pixels 11 may be accordingly adjusted, so as to change distribution of the image sensor pixels 11, thereby achieving an effect of differentiated pixel distribution in different regions of the image sensor according to actual demands.

Optionally, as shown in FIG. 1d, the deformation control part may comprise a light field control part 131, wherein the light field control part 131 is configured to adjust distribution of an external light field acting on the controllably-deformable material part 12, so as to control the controllably-deformable material part 12 to undergo corresponding deformation. Under this circumstance, the controllably-deformable material part 12 may comprise a photo-deformable material part that is at least made from a photo-deformable material. For example, the photo-deformable material part may comprise a photo-deformable material layer that is at least made from the photo-deformable material; or the photo-deformable material part may comprise a plurality of photo-deformable material connection sub-parts that is at least made from the photo-deformable material. Different regions of the controllably-deformable material part 12 are excited to undergo different degrees of deformation by means of changing, by the light field control part 131, distribution of a light field acting on the photo-deformable material part (in FIG. 1*d*, different arrow densities are used for representing different intensity distribution of a light field acting on the controllably-deformable material part 12), and an interval between the image sensor pixels 11 is accordingly adjusted through deformation of the controllably-deformable material part 12, so as to change distribution of the image sensor pixels 11, thereby achieving an effect of differentiated pixel distribution in different regions of the image sensor according to actual demands.

Figure 1F:
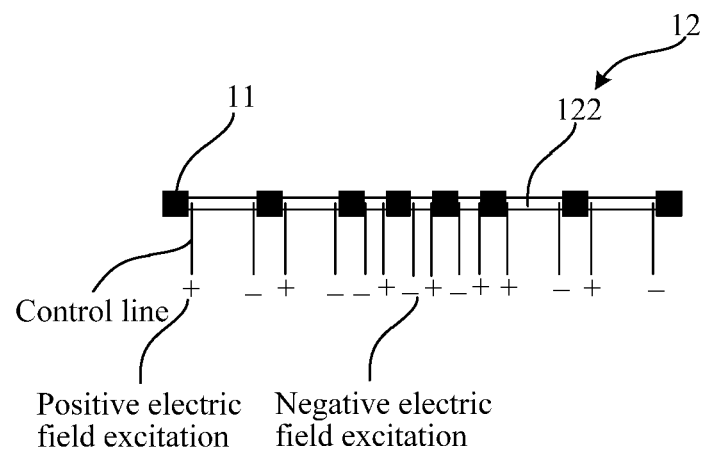
FIG. 1f is a scenario example of pixel density adjustment performed on an image sensor under a circumstance of uneven light field excitation, according to an embodiment of the present application.

Optionally, as shown in FIG. 1*e*, the deformation control part may comprise an electric field control part 132, wherein the electric field control part 132 is configured to adjust distribution of an external light field acting on the controllably-deformable material part, so as to control the controllably-deformable material part to undergo corresponding deformation. Under this circumstance, the controllably-deformable material part 12 may comprise a piezoelectric material part (such as a piezoelectric material layer or a piezoelectric material connection sub-part) at least made from a piezoelectric material, or the controllably-deformable material part 12 may comprise an electroactive polymer part (such as an electroactive polymer layer or an electroactive polymer connection sub-part) at least made from an electroactive polymer. As shown in FIG. 1*e*, an electric field control part and a controllably-deformable material may be connected by using a control line. Different regions of the controllably-deformable material part 12 are excited to undergo different degrees of deformation by means of changing by the electric field control part 132 distribution of an electric field acting on the controllably-deformable material part 12. If the electric field acting on the controllably-deformable material part 12 is a zero electric field, the controllably-deformable material part will not deform (or called zero electric field excitation); if intensity distribution of the electric field acting on the controllably-deformable material part 12 is changed (positive electric field excitation "+" and negative electric field excitation "−" as shown in the figure), the intensity of the electric field acting on different regions of the controllably-deformable material part 12 is caused to vary, as shown in FIG. 1*f*. In this way, different regions of the controllably-deformable material part may undergo different degrees of deformation, and an interval between the image sensor pixels 11 is accordingly adjusted through deformation of the controllably-deformable material part 12, so as to change integral pixel distribution of an image sensor, thereby achieving an effect of differentiated pixel distribution in different regions of the image sensor according to actual demands.

In this embodiment of the present application, the controllably-deformable material part may be directly or indirectly connected to the deformation control part. The deformation control part may act as a part of the image sensor or not. The image sensor may be connected to the deformation control part in a manner such as reserving a pin or an interface. The external field acting on the controllably-deformable material part may comprise but is not limited to an electric field, a magnetic field, a light field, or the like. A hardware and software structure used for generating an electric field, a hardware and software structure used for generating a magnetic field, and a hardware and software structure used for generating a light field, may be implemented by using corresponding existing technologies according to actual demands. The details are not described again in this embodiment of the present application.

Figure 1G:
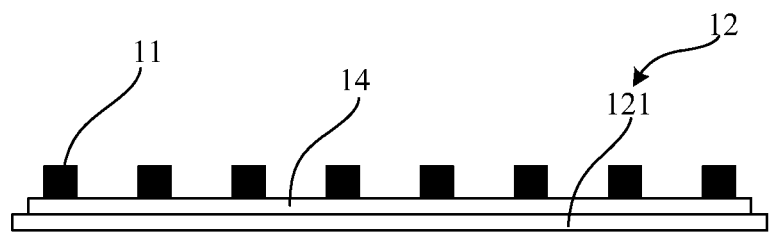
FIG. 1g is a schematic structural diagram of a fifth image sensor with an adjustable pixel density, according to an embodiment of the present application.
Figure 1H:
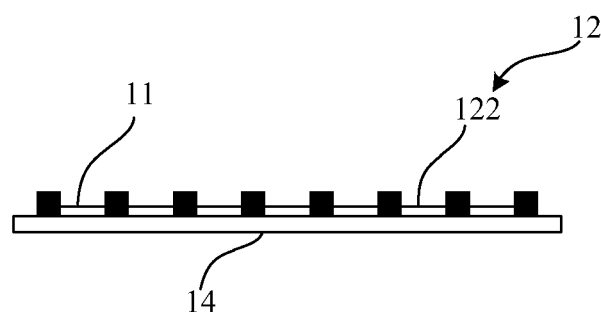
FIG. 1h is a schematic structural diagram of a sixth image sensor with an adjustable pixel density, according to an embodiment of the present application.

Optionally, the image sensor may further comprise a flexible lining, wherein the flexible lining may comprise but is not limited to a flexible plastic lining with certain flexibility. The shape of the flexible lining may be changed as demanded. Image sensor pixels and a controllably-deformable material part may be disposed on a same side or different sides of the flexible lining. For example, as shown in FIG. 1*g*, the plurality of image sensor pixels 11 is connected to a surface of a flexible lining 14, and a controllably-deformable material part (such as a controllably-deformable material layer 121) is connected to another surface of the flexible lining 14. For another example, as shown in FIG. 1*h*, the plurality of image sensor pixels 11 is connected to a surface of a flexible lining 14, and a controllably-deformable material part (such as a controllably-deformable material connection sub-part 122) is connected to a corresponding image sensor pixel and located with the image sensor pixel 11 on the same surface of the flexible lining 14. In this solution, integral pixel distribution of an image sensor is indirectly adjusted through deformation of a controllably-deformable material part under control of an external field acting thereon, thereby achieving an adjustable pixel density of the image sensor. In addition, the shape of the image sensor may be flexibly changed by using a flexible lining, for example, a planar image sensor is bent to a certain angular degree, so as to obtain a curved image sensor, thereby satisfying diversified application demands of image capture, decoration and the like.

Figure 1I:
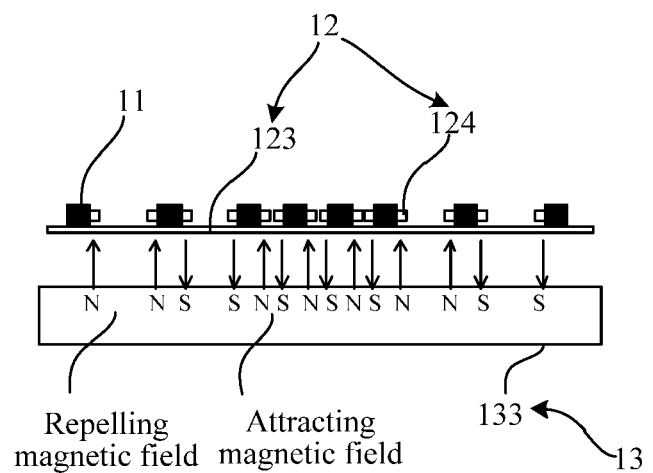
FIG. 1i is a schematic structural diagram of a seventh image sensor with an adjustable pixel density, according to an embodiment of the present application.

FIG. 1*i* is a schematic structural diagram of a seventh image sensor with an adjustable pixel density according to an embodiment of the present application. In an image sensor as shown in FIG. 1*i*, the controllably-deformable material part 12 comprises a flexible lining 123 and a plurality of magnetic conductive material parts 124, wherein a plurality of image sensor pixels 11 is separately connected to the flexible lining 123, and at least some of the image sensor pixels 11 are connected to the plurality of magnetic conductive material parts 124. The flexible lining 123 is caused to undergo corresponding deformation by change of a magnetic field acting on the magnetic conductive material part 124, so as to accordingly adjust density distribution of the plurality of image sensor pixels 11. For example, a magnetic conductive material part 124 may be disposed on a side of each image sensor pixel. Optionally, the image sensor pixel 11 is separately adhered to the flexible lining 123 and the magnetic conductive material part 124. The magnetic conductive material part may comprise a magnetic pole made from a magnetic conductive material, wherein the magnetic conductive material may comprise but is not limited to one or more of a soft magnetic material, a silicon steel sheet, a permalloy, a ferrite, an amorphous soft magnetic alloy, a super-microcrystalline soft magnetic alloy, and the like. The magnetic conductive material part made from a soft magnetic material has a good magnetic conductivity, and after removal of a magnetic field, residual magnetism is very small, which facilitates adjustment next time.

Further, optionally, the deformation control part 13 in this embodiment of the present application may further comprise a magnetic field control part 133, wherein the magnetic field control part 133 is configured to adjust distribution of an external magnetic field acting on the controllably-deformable material part, so as to control the controllably-deformable material part to undergo corresponding deformation. For example, when the magnetic control part 133 controls a magnetic field (namely, an exciting magnetic field) that acts on the magnetic conductive material part 124 to change, as shown in FIG. 1*i*, a repelling magnetic field induced by same magnetic poles (NN or SS) or an attracting magnetic field induced by different magnetic poles (NS or SN) with a certain distribution intensity is imposed on adjacent image sensor pixels, a force of magnetic repulsion or attraction between magnetic poles will be induced accordingly. The magnetic force is transmitted to the flexible lining 123, to cause the flexible lining 123 to undergo deformation such as expansion and shrinkage, thereby changing an interval between corresponding image sensor pixels, and achieving a purpose of adjusting pixel distribution of an image sensor. In combination with deformability (such as expandability and shrinkage) characteristics of a flexible lining and the principle of magnetic field control, this solution can achieve adjustable pixel distribution of an image sensor.

Figure 1J:
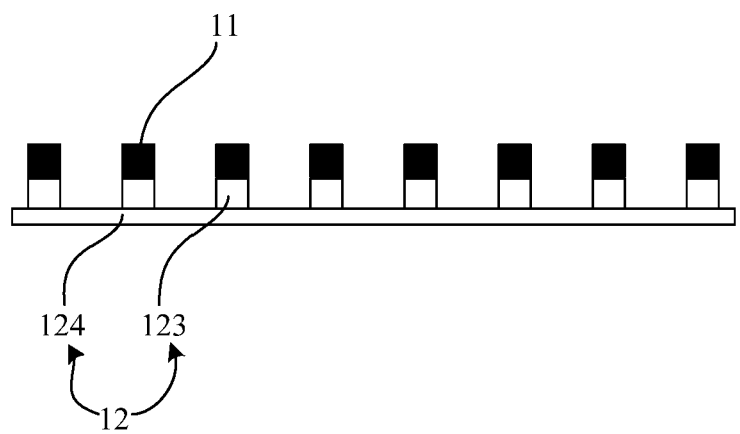
FIG. 1j is a schematic structural diagram of an eighth image sensor with an adjustable pixel density, according to an embodiment of the present application.

FIG. 1*j* is a schematic structural diagram of an eighth image sensor with an adjustable pixel density according to an embodiment of the present application. In an image sensor as shown in FIG. 1*j*, the controllably-deformable material part 12 comprises: a flexible lining 123 and a plurality of magnetic conductive material parts 124, wherein a surface of each of the plurality of magnetic conductive material parts 124 is separately connected to the flexible lining 123, and an opposite surface of each of the plurality of magnetic conductive material parts 124 is separately connected to the plurality of image sensor pixels 11 correspondingly. The flexible lining 123 is caused to undergo corresponding deformation by change of a magnetic field acting on the magnetic conductive material part 124, so as to accordingly adjust density distribution of the plurality of image sensor pixels 11. Optionally, the magnetic conductive material part 124 is adhered to the flexible lining 123, and the image sensor pixels 11 are adhered to the magnetic conductive material part 124. When a magnetic field acting on the magnetic conductive material part 124 changes, a magnetic force is transmitted to the flexible lining 123, and causes the flexible lining 123 to deform such as expand or shrink, thereby achieving a purpose of adjusting distribution of image sensor pixels. In combination with deformability (such as expandability and shrinkage) characteristics of a flexible lining and the principle of magnetic field control, this solution can achieve adjustable pixel distribution of an image sensor.

It may be understood by a person skilled in the art that, in any one of the foregoing methods of specific implementation manners of the present application, the value of the serial number of each step described above does not mean an execution sequence, and the execution sequence of the steps should be determined according to the function and internal logic thereof, and should not constitute any limitation to the implementation procedure of the specific implementation manners of the present application.

Figure 3:
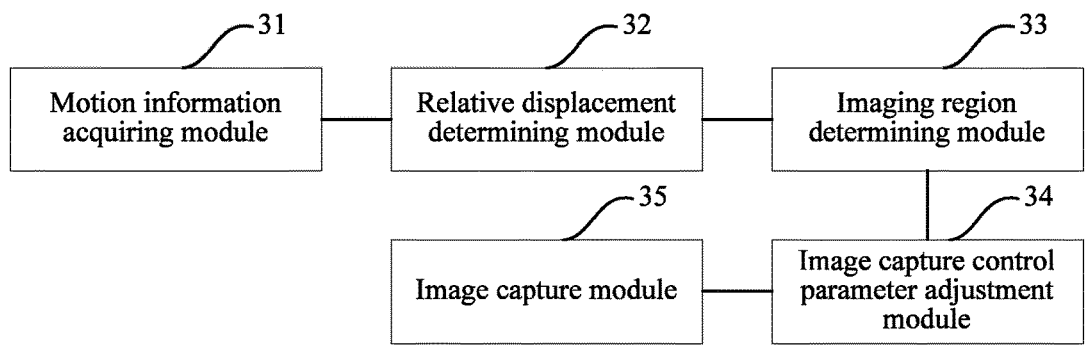
FIG. 3 is a logic block diagram of an image capture control apparatus, according to an embodiment of the present application.

FIG. 3 is a structural block diagram of an image capture control apparatus according to an embodiment of the present application. As shown in FIG. 3, the image capture control apparatus provided by this embodiment of the present application comprises: a motion information acquiring module 31, a relative displacement determining module 32, an imaging region determining module 33, an image capture control parameter adjustment module 34 and an image capture module 35.

The motion information acquiring module 31 is configured to acquire motion information of an object to be shot.

The relative displacement determining module 32 is configured to determine, according to the motion information, a relative displacement of an image that corresponds to the object to be shot on an image sensor within a first exposure duration.

The imaging region determining module 33 is configured to determine an imaging region that corresponds to the relative displacement in the image sensor.

The image capture control parameter adjustment module 34 is configured to adjust an image capture control parameter of the imaging region so as to shorten exposure duration of the imaging region.

The image capture module 35 is configured to perform, by using the image sensor after being adjusted, image capture on the object to be shot.

According to the technical solution provided by this embodiment of the present application, an imaging region of an image sensor that is possibly involved in motion of an object to be shot is determined, and an image capture control parameter of the imaging region is adjusted. Image capture control parameters of the image sensor after being adjusted exhibit differentiated distribution. The image capture control parameter of the imaging region is different from an image capture control parameter of another region, which is manifested as that an exposure duration of the imaging region is shorter than that of another region of the image sensor during the process of image capture by the image sensor after being adjusted. In this way, for the imaging region of the image sensor that is possibly involved in motion of the object to be shot, exposure can be completed at a high speed so as to reduce the degree of image blur for the imaging region due to motion of the object to be shot as far as possible, without affecting the quality of an image captured by another region of the image sensor, thereby improving overall quality of an image captured by the image sensor.

The image capture control apparatus may perform capture control on a static or dynamic image by using the image capture control method during an application procedure comprising but not limited to photo taking, camera shooting, photographing, and video monitoring. There is no limit to the manners in which the image capture control apparatus is embodied. For example, the image capture control apparatus may be an independent component, the component cooperating with an image capture device comprising an image sensor in communications; or the image capture control apparatus may be integrated as a functional module into an image capture device comprising an image sensor, which is not limited in this embodiment of the present application.

Figure 4:
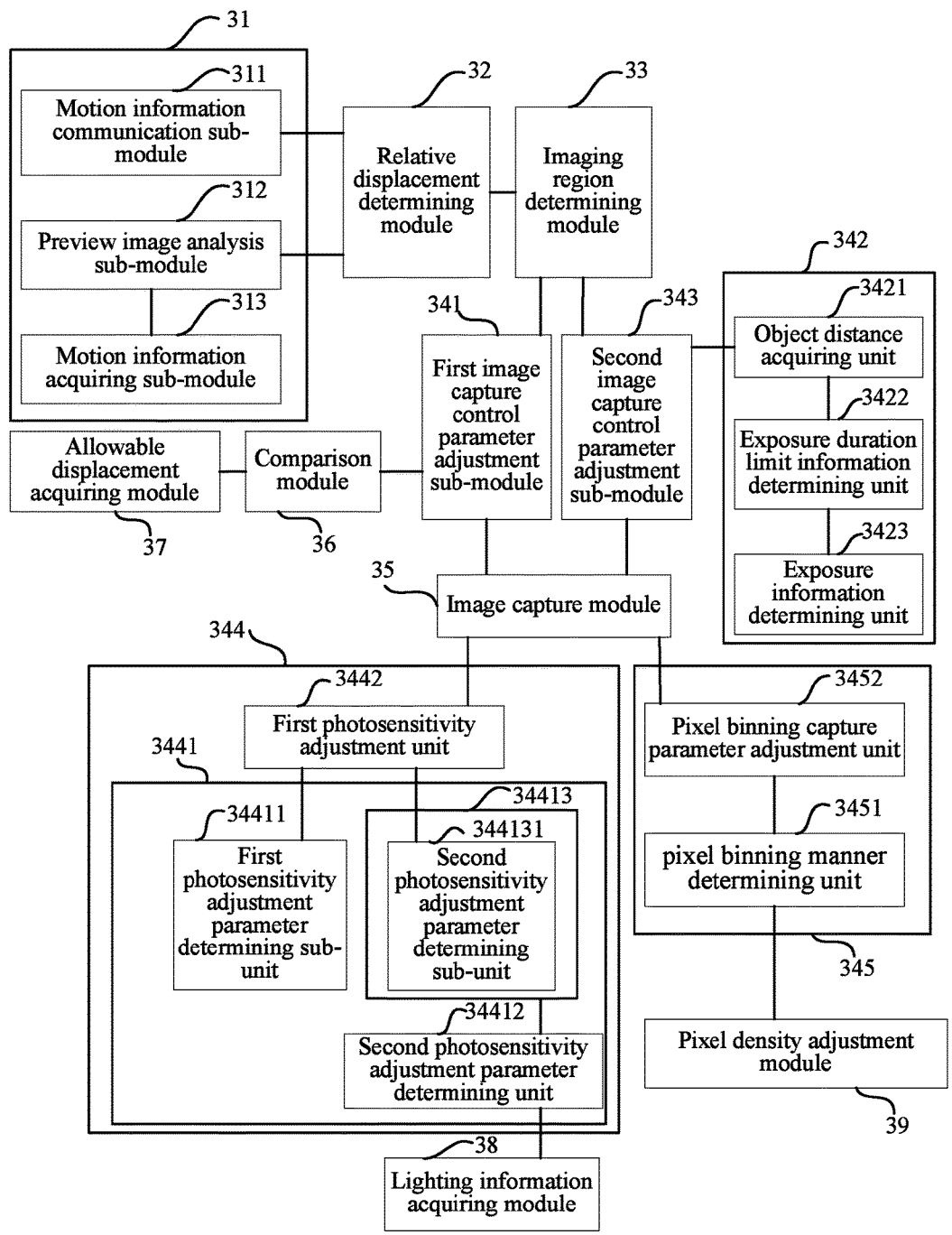
FIG. 4 is a logic block diagram of another image capture control apparatus, according to an embodiment of the present application.

Optionally, as shown in FIG. 4, the motion information acquiring module 31 comprises a motion information communication sub-module 311. The motion information communication sub-module 311 is configured to receive motion information of the object to be shot. In this solution, image capture control may be implemented by fully utilizing interaction of intelligent devices or in a manner such as sharing of motion information of an object to be shot, so as to improve flexibility of motion information acquiring.

Optionally, as shown in FIG. 4, the motion information acquiring module 31 comprises a preview image analysis sub-module 312 and a motion information acquiring sub-module 313. The preview image analysis sub-module 312 is configured to analyze a preview image of the object to be shot; and the motion information acquiring sub-module 313 is configured to acquire, according to an analysis result, motion information of the object to be shot. In this solution, motion information of an object to be shot is acquired by means of analyzing a preview image of the object to be shot before formal shooting and estimating a rough motion trend of the object to be shot, which is simple and easily implemented.

Optionally, as shown in FIG. 4, the image capture control apparatus further comprises a comparison module 36. The comparison module 36 is configured to compare the relative displacement with an allowable displacement. Under this circumstance, the image capture control parameter adjustment module 34 comprises a first image capture control parameter adjustment sub-module 341. The first image capture control parameter adjustment sub-module 341 is configured to adjust, in response to a case in which a comparison result shows that the relative displacement exceeds the allowable displacement, an image capture control parameter of the imaging region. In this solution, partial adjustment on an image capture control parameter of the image sensor may also be triggered and controlled, thereby improving universality of this embodiment of the present application, and satisfying a user's diversified actual application demands.

Optionally, as shown in FIG. 4, the image capture control apparatus further comprises an allowable displacement acquiring module 37. The allowable displacement acquiring module 37 is configured to acquire the allowable displacement. The manner of acquiring the allowable displacement is very flexible, which is not limited in this embodiment of the present application.

Optionally, as shown in FIG. 4, the image capture control parameter adjustment module 34 comprises: an exposure duration determining sub-module 342 and a second image capture control parameter adjustment sub-module 343. The exposure duration determining sub-module 342 is configured to determine a second exposure duration, the second exposure duration being less than the first exposure duration; and the second image capture control parameter adjustment sub-module 343 is configured to adjust, according to the second exposure duration, an image capture control parameter of the imaging region. In practical application, the meanings of the first exposure duration and the second exposure duration may vary slightly with different types of image sensors or different exposure modes of image capture of an image sensor, which may be determined according to actual situation. For example, for an image sensor that supports progressive scanning and capture, such as a rolling shutter image sensor, the first exposure duration may be a default exposure duration for each row of pixels of the image sensor, and the second exposure duration is an expected exposure duration of a row where pixel points of the imaging region are located; for another example, for an image sensor that supports single pixel point exposure adjustment, the first exposure duration may be a default exposure duration of a single pixel point of the image sensor, and the second exposure duration is an expected exposure duration of a single pixel point of the imaging region; and the like.

Optionally, as shown in FIG. 4, the exposure duration determining sub-module 342 comprises: an object distance acquiring unit 3421, an exposure duration limit information determining unit 3422 and an exposure information determining unit 3423. The object distance acquiring unit 3421 is configured to acquire an object distance of the object to be shot; the exposure duration limit information determining unit 3422 is configured to determine, according to the allowable displacement, the object distance and the motion information, exposure duration limit information; and the exposure information determining unit 3423 is configured to determine, according to the exposure duration limit information, the second exposure duration. In practical application, a short expected exposure duration, namely, a second exposure duration, may be determined according to an expectation for clearness of an image captured by the imaging region. An image capture control parameter of the imaging region is adjusted according to the determined second exposure duration, to cause actual exposure duration of the imaging region during image capture after adjustment on the image capture control parameter to be equal to or close to the second exposure duration as far as possible. In this solution, a short expected exposure duration may be flexibly determined according to actual demands, based on which an image capture control parameter of the imaging region is adjusted so as to improve a matching degree between an adjustment result and actual demands.

In an alternative implementation manner, the image capture control parameter comprises photosensitivity. Under this circumstance, the image capture control parameter adjustment module 34 comprises a photosensitivity adjustment sub-module 344. The photosensitivity adjustment sub-module 344 is configured to adjust photosensitivity of the imaging region so as to shorten exposure duration of the imaging region. In this solution, an exposure duration of a partial region (namely, the imaging region) of the image sensor is shortened by means of adjusting photosensitivity of the imaging region, to cause spatial resolution of an entire image captured by the image sensor not to change as far as possible, and reduce the degree of partial image blur caused by motion of an object to be shot during the process of image capture as far as possible, thereby improving imaging quality of the entire image.

Optionally, the photosensitivity adjustment sub-module 344 comprises a first photosensitivity adjustment parameter determining unit 3441 and a first photosensitivity adjustment unit 3442. The first photosensitivity adjustment parameter determining unit 3441 is configured to determine, according to the second exposure duration, a photosensitivity adjustment parameter; and the first photosensitivity adjustment unit 3442 is configured to adjust, according to the determined photosensitivity adjustment parameter, photosensitivity of the imaging region.

The first photosensitivity adjustment parameter determining unit 3441 comprises a first photosensitivity adjustment parameter determining sub-unit 34411. The photosensitivity adjustment parameter determining sub-unit 34411 is configured to determine, according to a first mapping relationship between an exposure duration and a photosensitivity adjustment parameter, a photosensitivity adjustment parameter that corresponds to the second exposure duration. This solution is simple and easily implemented with a high efficiency.

Optionally, the image capture control apparatus further comprises a lighting information acquiring module 38. The lighting information acquiring module 38 is configured to acquire lighting information of the object to be shot. Under this circumstance, the first photosensitivity adjustment sub-module 3441 comprises a second photosensitivity adjustment parameter determining unit 34412 and a second photosensitivity adjustment unit 34413. The second photosensitivity adjustment parameter determining unit 34112 is configured to determine, according to lighting information of the object to be shot and the second exposure duration, a photosensitivity adjustment parameter; and the second photosensitivity adjustment unit 34413 is configured to adjust, according to the determined photosensitivity adjustment parameter, photosensitivity of the imaging region.

Optionally, the second photosensitivity adjustment unit 34413 comprises a second photosensitivity adjustment parameter determining sub-unit 344131. The second photosensitivity adjustment parameter determining sub-unit 344131 is configured to determine, according to a second mapping relationship between lighting information, exposure duration and a photosensitivity adjustment parameter, a photosensitivity adjustment parameter that corresponds to lighting information of the object to be shot and the second exposure duration. In this solution, the photosensitivity adjustment parameter is comprehensively determined by combining factors such as lighting information of an object to be shot and a second exposure duration, thereby improving accuracy of the photosensitivity adjustment.

In another alternative implementation manner, the image capture control parameter comprises a pixel binning capture parameter. The image capture control parameter adjustment module 34 comprises a pixel binning capture parameter adjustment sub-module 345. The pixel binning capture parameter adjustment sub-module 345 is configured to adjust a pixel binning capture parameter of the imaging region so as to shorten exposure duration of the imaging region. In this solution, an exposure duration of a partial region (namely, the imaging region) of the image sensor is shortened by means of adjusting a pixel binning capture parameter of the imaging region, to cause a signal-to-noise ratio of an entire image captured by the image sensor not to change as far as possible, and reduce the degree of partial image blur caused by motion of an object to be shot during the process of image capture as far as possible, thereby improving imaging quality of the entire image.

Optionally, the pixel binning capture parameter adjustment sub-module 345 comprises a pixel binning manner determining unit 3451 and a pixel binning capture parameter adjustment unit 3452. The pixel binning manner determining unit 3451 is configured to determine, according to a third mapping relationship between an exposure duration and a pixel binning manner, a pixel binning manner that corresponds to the second exposure duration; and the pixel binning capture parameter adjustment unit 3452 is configured to adjust, according to the pixel binning manner, a pixel binning capture parameter of the imaging region. This solution is simple and easily implemented.

Optionally, the image capture control apparatus further comprises a pixel density adjustment module 39. The pixel density adjustment module 39 is configured to adjust, before the pixel binning capture parameter adjustment sub-module 345 performs adjustment on a pixel binning capture parameter of the imaging region, pixel distribution of the image sensor so as to increase the number of pixel points within the imaging region. This solution improves spatial resolution of a sub-image that corresponds to the imaging region in an image captured by an image sensor. For the image sensor, a flexible image sensor may be used, or an image sensor with a structure accordingly recorded as shown in FIG. 1b to FIG. 1j may be used. The image capture control apparatus can directly control the external field so as to control deformation of the controllably-deformable material part, thereby adjusting pixel distribution of the image sensor; or the image capture control apparatus can indirectly control the external field by controlling the deformation control part, to cause the controllably-deformable material part to undergo corresponding deformation, thereby accordingly adjusting pixel distribution of the image sensor; or the like. The physical connection manner of the image sensor pixels and the controllably-deformable material part may be determined according to actual demands, which is not limited in this embodiment of the present application, as far as pixel density distribution of the image sensor can be adjusted when the controllably-deformable material part deforms. For the specific implementation manner, refer to the aforementioned corresponding description, and the details are not described herein again.

Figure 5:
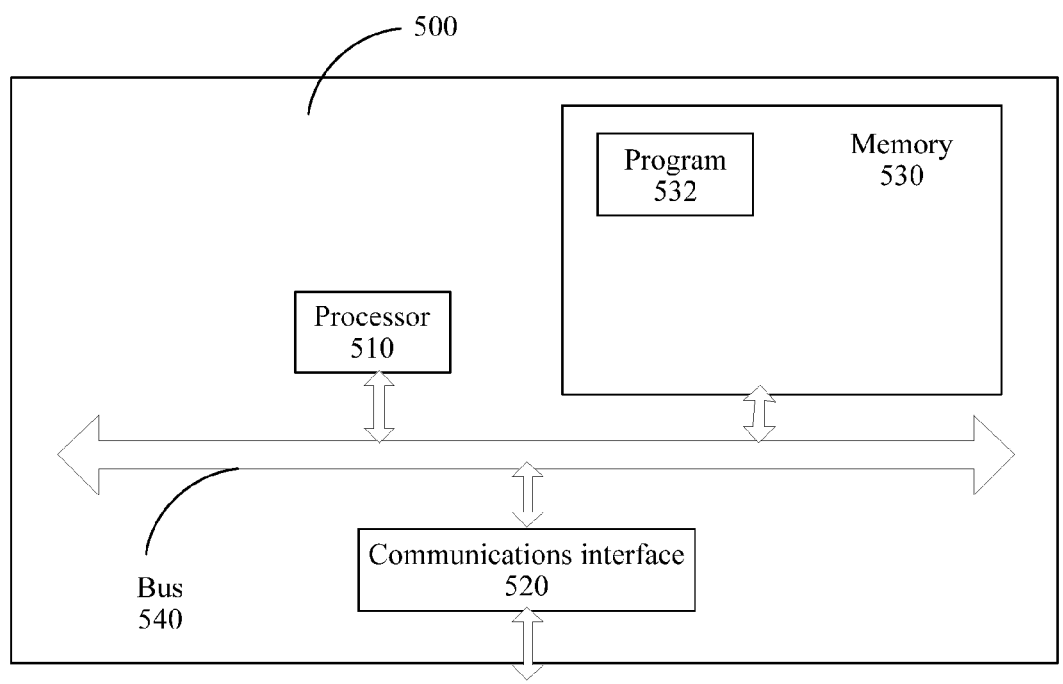
FIG. 5 is a logic block diagram of still another image capture control apparatus, according to an embodiment of the present application.

FIG. 5 is a structural block diagram of still another image capture control apparatus according to an embodiment of the present application. The specific implementation manner of the image capture control apparatus 500 is not limited in specific embodiments of the present application. As shown in FIG. 5, the image capture control apparatus 500 may comprise:

a processor 510, a communications interface 520, a memory 530, and a communications bus 540, wherein:

the processor 510, the communications interface 520, and the memory 530 communicate with each other by using the communications bus 540;

the communications interface 520 is configured to communication with, for example, a device having a function of communications, and an external optical source; and the processor 510 is configured to execute a program 532, and specifically, can perform relevant steps in any one of the foregoing embodiments of an image capture control method.

For example, the program 532 may comprise program code, wherein the program code comprises a computer operation instruction.

The processor 510 may be a central processing unit (CPU for short), an application specific integrated circuit (ASIC for short), or one or more integrated circuits configured to implement the embodiments of the present application.

The memory 530 is configured to store the program 532. The memory 530 may comprise a random access memory (RAM for short), and may also comprise a non-volatile memory, for example, at least one magnetic disk memory.

For example, in an alternative implementation manner, the processor 510 may perform by means of executing the program 532, the following steps: acquiring motion information of an object to be shot; determining, according to the motion information, a relative displacement of an image that corresponds to the object to be shot on an image sensor within a first exposure duration; determining an imaging region that corresponds to the relative displacement in the image sensor; adjusting an image capture control parameter of the imaging region, to shorten exposure duration of the imaging region; and performing, by using the image sensor after being adjusted, image capture on the object to be shot.

In another alternative implementation manner, the processor 510 can also perform, by executing the program 532, steps mentioned in any other one of the foregoing embodiments, and the details are not described herein again.

For specific implementation of steps of the program 532, refer to the description of corresponding steps, modules, sub-modules and units in the foregoing embodiments. The details are not described herein again. A person skilled in the art may clearly understand that, for the specific operation procedure of the above devices and modules, the description of corresponding procedures in the foregoing method embodiments may be referred to for the purpose of convenient and brief description. The details are not described herein again.

In the foregoing embodiments of the present application, the serial number and/or sequence of the embodiments are only used for the convenience of description, and do not represent inferiority or superiority of the embodiments. The description of each embodiment has a different focus. For any part of an embodiment not described in details, refer to relevant description of another embodiment. For relevant description of the implementation principle or process of apparatus, device or system embodiments, refer to records of relevant method embodiments, and the details are not described herein again.

A person of ordinary skill in the art may recognize that, the units, methods and procedures of each example described with reference to the embodiments disclosed herein, can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or a part thereof contributing to the existing art, or a part of the technical solutions may be implemented in the form of a software product. The computer software product is stored in a storage medium and comprises several instructions for instructing a computer device (which may be a personal computer, a server, a network device, or the like) to perform all or some of the steps of the image capture control methods in the embodiments of the present application. The foregoing storage medium comprises: any medium that can store program code, such as a USB flash drive, a removable hard disk, a read-only memory (ROM for short), a random access memory (RAM for short), a magnetic disk, or an optical disc.

In the apparatus, method and system embodiments of the present application, apparently, each component (such as a system, a sub-system, a module, a sub-module, a unit, and a sub-unit) or each step may be decomposed, combined and/or recombined after decomposition. Such decomposition and/or recombination shall be considered as an equivalent solution of the present application. In addition, in the above description of specific embodiments of the present application, a feature described and/or shown in one implementation manner may be used in one or more other implementation manners by using a same or similar manner, combined with a feature of another implementation manner, or replace a feature of another implementation manner.

It should be emphasized that, the term "comprise" used herein refers to existence of a feature, an element, a step or a component, but does not exclude existence or addition of one or more other features, elements, steps or components.

Finally, it should be noted that, the above implementation manners are only used to describe the present application, rather than limit the present application. Various alterations and variants may also be made by a person of ordinary skill in the art without departing from the spirit and scope of the present application. Therefore, all equivalent technical solutions also belong to the scope of the present application, and the patent protection scope of the present application should be subject to the claims.

What is claimed is:

1. An image capture control method, comprising:
   acquiring motion information of an object;
   determining, according to the motion information, a relative displacement of an image that corresponds to the object on an image sensor within a first exposure duration;
   determining an imaging region that corresponds to the relative displacement in the image sensor;
   adjusting an image capture control parameter of the imaging region, to shorten the first exposure duration of the imaging region; and
   performing, by using the image sensor after being adjusted, an image capture on the object,
   wherein the image capture control parameter comprises a pixel binning capture parameter; and wherein the adjusting an image capture control parameter of the imaging region, to shorten exposure duration of the imaging region comprises: adjusting the pixel binning capture parameter of the imaging region to shorten the exposure duration of the imaging region; and
   wherein before the adjusting the pixel binning capture parameter of the imaging region, the method further comprises: adjusting pixel distribution of the image sensor to increase the number of pixel points within the imaging region.

2. The image capture control method of claim 1, wherein the acquiring motion information of the object comprises receiving motion information of the object.

3. The image capture control method of claim 1, wherein the acquiring motion information of the object comprises:
   analyzing a preview image of the object; and
   acquiring, according to an analysis result, motion information of the object.

4. The image capture control method of claim 1, wherein:
   before the adjusting an image capture control parameter of the imaging region, the image capture control method further comprises: comparing the relative displacement with an allowable displacement; and wherein:
   the adjusting an image capture control parameter of the imaging region comprises: adjusting, in response to a case in which a comparison result shows that the relative displacement exceeds the allowable displacement, the image capture control parameter of the imaging region.

5. The image capture control method of claim 4, wherein the image capture control method further comprises acquiring the allowable displacement.

6. The image capture control method of claim 1, wherein the adjusting an image capture control parameter of the imaging region comprises:
   determining a second exposure duration, the second exposure duration being less than the first exposure duration; and
   adjusting, according to the second exposure duration, the image capture control parameter of the imaging region.

7. The image capture control method of claim 6, wherein:
   the first exposure duration is a default exposure duration for each row of pixels of the image sensor; and
   the second exposure duration is an expected exposure duration for a row where pixel points of the imaging region are located.

8. The image capture control method of claim 6, wherein:
   the first exposure duration is a default exposure duration for a single pixel point of the image sensor; and
   the second exposure duration is an expected exposure duration for a single pixel point of the imaging region.

9. The image capture control method of claim 6, wherein determining the second exposure duration comprises:
   acquiring an object distance of the object;
   determining, according to the allowable displacement, the object distance and the motion information, exposure duration limit information; and determining, according to the exposure duration limit information, the second exposure duration.

10. The image capture control method of claim 1, wherein the image capture control parameter comprises a photosensitivity; and wherein
the adjusting an image capture control parameter of the imaging region, to shorten exposure duration of the imaging region comprises: adjusting the photosensitivity of the imaging region to shorten exposure duration of the imaging region.

11. The image capture control method of claim 10, wherein adjusting the photosensitivity of the imaging region comprises:
determining, according to the second exposure duration, a photosensitivity adjustment parameter; and
adjusting, according to the determined photosensitivity adjustment parameter, the photosensitivity of the imaging region.

12. The image capture control method of claim 11, wherein the determining, according to the second exposure duration, the photosensitivity adjustment parameter comprises:
determining, according to a first mapping relationship between an exposure duration and the photosensitivity adjustment parameter, the photosensitivity adjustment parameter that corresponds to the second exposure duration.

13. The image capture control method of claim 10, wherein:
the image capture control method further comprises: acquiring lighting information of the object; and
adjusting the photosensitivity of the imaging region comprises: determining, according to lighting information of the object and the second exposure duration, a photosensitivity adjustment parameter; and adjusting, according to the determined photosensitivity adjustment parameter, the photosensitivity of the imaging region.

14. The image capture control method of claim 13, wherein the determining, according to lighting information of the object and the second exposure duration, the photosensitivity adjustment parameter comprises:
determining, according to a second mapping relationship between lighting information, an exposure duration and the photosensitivity adjustment parameter, the photosensitivity adjustment parameter that corresponds to the lighting information of the object and the second exposure duration.

15. The image capture control method of claim 1, wherein the adjusting the pixel binning capture parameter of the imaging region comprises:
determining, according to a third mapping relationship between an exposure duration and a pixel binning manner, a pixel binning manner that corresponds to the second exposure duration; and
adjusting, according to the pixel binning manner, the pixel binning capture parameter of the imaging region.

16. An image capture control apparatus, comprising:
a motion information acquiring module, configured to acquire motion information of an object;
a relative displacement determining module, configured to determine, according to the motion information, a relative displacement of an image that corresponds to the object on an image sensor within a first exposure duration;
an imaging region determining module, configured to determine an imaging region that corresponds to the relative displacement in the image sensor;
an image capture control parameter adjustment module, configured to adjust an image capture control parameter of the imaging region, so as to shorten the first exposure duration of the imaging region; and
an image capture module, configured to perform, by using the image sensor after being adjusted, an image capture on the object,
wherein the image capture control parameter comprises a pixel binning capture parameter; and the image capture control parameter adjustment module comprises a pixel binning capture parameter adjustment sub-module, configured to adjust the pixel binning capture parameter of the imaging region so as to shorten exposure duration of the imaging region, and
wherein the image capture control apparatus further comprises: a pixel density adjustment module, configured to adjust, before the pixel binning capture parameter of the imaging region is adjusted by the pixel binning capture parameter adjustment sub-module, pixel distribution of the image sensor so as to increase the number of pixel points within the imaging region.

17. The image capture control apparatus of claim 16, wherein the motion information acquiring module comprises:
a motion information communication sub-module, configured to receive motion information of the object.

18. The image capture control apparatus of claim 16, wherein the motion information acquiring module comprises:
a preview image analysis sub-module, configured to analyze a preview image of the object; and
a motion information acquiring sub-module, configured to acquire, according to an analysis result, motion information of the object.

19. The image capture control apparatus of claim 16, wherein:
the image capture control apparatus further comprises a comparison module, configured to compare the relative displacement with an allowable displacement; and
the image capture control parameter adjustment module comprises a first image capture control parameter adjustment sub-module, configured to adjust, in response to a case in which a comparison result shows that the relative displacement exceeds the allowable displacement, the image capture control parameter of the imaging region.

20. The image capture control apparatus of claim 19, wherein the image capture control apparatus further comprises
an allowable displacement acquiring module, configured to acquire the allowable displacement.

21. The image capture control apparatus of claim 16, wherein the image capture control parameter adjustment module comprises:
an exposure duration determining sub-module, configured to determine a second exposure duration, the second exposure duration being less than the first exposure duration; and
a second image capture control parameter adjustment sub-module, configured to adjust, according to the second exposure duration, the image capture control parameter of the imaging region.

22. The image capture control apparatus of claim 21, wherein:

the first exposure duration is a default exposure duration for each row of pixels of the image sensor; and the second exposure duration is an expected exposure duration for a row where pixel points of the imaging region are located.

23. The image capture control apparatus of claim 21, wherein:

the first exposure duration is a default exposure duration for a single pixel point of the image sensor; and the second exposure duration is an expected exposure duration for a single pixel point of the imaging region.

24. The image capture control apparatus of claim 21, wherein the exposure duration determining sub-module comprises:

an object distance acquiring unit, configured to acquire an object distance of the object;

an exposure duration limit information determining unit, configured to determine, according to the allowable displacement, the object distance and the motion information, exposure duration limit information; and an exposure information determining unit, configured to determine, according to the exposure duration limit information, the second exposure duration.

25. The image capture control apparatus of claim 16, wherein the image capture control parameter comprises a photosensitivity; and the image capture control parameter adjustment module comprises a photosensitivity adjustment sub-module, configured to adjust the photosensitivity of the imaging region so as to shorten exposure duration of the imaging region.

26. The image capture control apparatus of claim 25, wherein the photosensitivity adjustment sub-module comprises:

a first photosensitivity adjustment parameter determining unit, configured to determine, according to the second exposure duration, a photosensitivity adjustment parameter; and a first photosensitivity adjustment unit, configured to adjust, according to the determined photosensitivity adjustment parameter, the photosensitivity of the imaging region.

27. The image capture control apparatus of claim 26, wherein the first photosensitivity adjustment parameter determining unit comprises:

a first photosensitivity adjustment parameter determining sub-unit, configured to determine, according to a first mapping relationship between an exposure duration and the photosensitivity adjustment parameter, the photosensitivity adjustment parameter that corresponds to the second exposure duration.

28. The image capture control apparatus of claim 25, wherein the image capture control apparatus further comprises:

a lighting information acquiring module, configured to acquire lighting information of the object; and the photosensitivity adjustment sub-module comprises:

a second photosensitivity adjustment parameter determining unit, configured to determine, according to lighting information of the object and the second exposure duration, a photosensitivity adjustment parameter; and a second photosensitivity adjustment unit, configured to adjust, according to the determined photosensitivity adjustment parameter, the photosensitivity of the imaging region.

29. The image capture control apparatus of claim 28, wherein the second photosensitivity adjustment unit comprises:

a second photosensitivity adjustment parameter determining sub-unit, configured to determine, according to a second mapping relationship between lighting information, an exposure duration and the photosensitivity adjustment parameter, the photosensitivity adjustment parameter that corresponds to lighting information of the object and the second exposure duration.

30. The image capture control apparatus of claim 16, wherein the pixel binning capture parameter adjustment sub-module comprises:

a pixel binning manner determining unit, configured to determine, according to a third mapping relationship between an exposure duration and a pixel binning manner, a pixel binning manner that corresponds to the second exposure duration; and a pixel binning capture parameter adjustment unit, configured to adjust, according to the pixel binning manner, the pixel binning capture parameter of the imaging region.

31. A computer readable storage apparatus, comprising at least one executable instruction, which, in response to execution, causes an image capture control apparatus comprising a processor to perform operations, comprising:

acquiring motion information of an object;

determining, according to the motion information, a relative displacement of an image that corresponds to the object on an image sensor within a first exposure duration;

determining an imaging region that corresponds to the relative displacement in the image sensor;

adjusting an image capture control parameter of the imaging region, to shorten the first exposure duration of the imaging region; and performing, by using the image sensor after being adjusted, an image capture on the object, wherein the image capture control parameter comprises a pixel binning capture parameter;

and wherein the adjusting an image capture control parameter of the imaging region, to shorten exposure duration of the imaging region comprises: adjusting the pixel binning capture parameter of the imaging region to shorten the exposure duration of the imaging region; and wherein before the adjusting the pixel binning capture parameter of the imaging region, the method further comprises: adjusting pixel distribution of the image sensor to increase the number of pixel points within the imaging region.

32. An image capture control apparatus, characterized by comprising a processor and a memory, the memory storing computer executable instructions, the processor being connected to the memory through a communication bus, and when the apparatus for controlling task migration operates, the processor executing the computer executable instructions stored in the memory, so that the apparatus for controlling task migration executes operations, comprising:

acquiring motion information of an object;

determining, according to the motion information, a relative displacement of an image that corresponds to the object on an image sensor within a first exposure duration;

determining an imaging region that corresponds to the relative displacement in the image sensor;

adjusting an image capture control parameter of the imaging region, to shorten the first exposure duration of the imaging region; and performing, by using the image sensor after being adjusted, an image capture on the object, wherein the image capture control parameter comprises a pixel binning capture parameter; and wherein the adjusting an image capture control parameter of the imaging region, to shorten exposure duration of the imaging region comprises: adjusting the pixel binning capture parameter of the imaging region to shorten the exposure duration of the imaging region; and wherein before the adjusting the pixel binning capture parameter of the imaging region, the method further comprises: adjusting pixel distribution of the image sensor to increase the number of pixel points within the imaging region.

\* \* \* \* \*